(12) United States Patent
Liang et al.

(10) Patent No.: US 10,754,917 B2
(45) Date of Patent: Aug. 25, 2020

(54) METHOD AND SYSTEM FOR DISPLAYING CUSTOMIZED WEBPAGE ON DOUBLE WEBVIEW

(71) Applicant: Alibaba Group Holding Limited, Grand Cayman (KY)

(72) Inventors: Jie Liang, Beijing (CN); Yongfu Yu, Beijing (CN); Xiaopeng He, Beijing (CN); Shunyan Zhu, Beijing (CN); Miaokui Ma, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 794 days.

(21) Appl. No.: 14/838,891

(22) Filed: Aug. 28, 2015

(65) Prior Publication Data
US 2015/0370912 A1   Dec. 24, 2015

Related U.S. Application Data

(63) Continuation of application No. PCT/CN2013/087803, filed on Nov. 26, 2013.

(30) Foreign Application Priority Data

Mar. 4, 2013   (CN) .......................... 2013 1 0067421

(51) Int. Cl.
*G06F 17/00*   (2019.01)
*G06F 16/958*   (2019.01)
(Continued)

(52) U.S. Cl.
CPC ............ *G06F 16/972* (2019.01); *G06F 9/451* (2018.02); *G06F 40/14* (2020.01); *G06F 40/186* (2020.01)

(58) Field of Classification Search
None
See application file for complete search history.

(56) References Cited

U.S. PATENT DOCUMENTS 6,944,817 B1 * 9/2005 Danneels .......... G06F 17/30867
707/999.001
6,955,298 B2 * 10/2005 Herle ................ G06F 17/30905
235/472.01
(Continued)

FOREIGN PATENT DOCUMENTS

| CN | 102012821 A | 4/2011 |
| CN | 102486799 A | 6/2012 |
| CN | 102810105 A | 12/2012 |

OTHER PUBLICATIONS

International Search Report and Written Opinion for International Application No. PCT/CN2013/087803 dated Feb. 27, 2014.

*Primary Examiner* — Mustafa A Amin
(74) *Attorney, Agent, or Firm* — Alston & Bird LLP

(57) ABSTRACT

The present invention provides a method and a system for the display of customized pages with Double WebView. The method includes: determining a template type to generate a customized page based on loaded information of an original web page, wherein the original web page is loaded via a mobile Internet; creating a new WebView associated with a primary web page based on the template type, wherein the primary web page is the original web page or a web page evolved from operating on the original web page; loading a template corresponding to the template type of the new WebView; creating a built-in JavaScript object within the new WebView; obtaining data of the primary web page through the built-in JavaScript object; generating a customized page within the new WebView based on the data of the primary web page; and displaying the customized page. The present invention can realize the customization of web pages (Continued)

without the support of a customization server and the modification to the primary web page. They can also make possible the switch between the primary web page and the customized page seamlessly, almost instantaneously. At the same time, they are able to screen and block advertisements on the web page.

20 Claims, 4 Drawing Sheets

(51) Int. Cl.
    *G06F 9/451*             (2018.01)
    *G06F 40/14*             (2020.01)
    *G06F 40/186*           (2020.01)

(56) References Cited

U.S. PATENT DOCUMENTS

| | | | | |
|---|---|---|---|---|
| 7,047,318 | B1* | 5/2006 | Svedloff | G06F 17/3089 707/E17.116 |
| 7,346,842 | B1* | 3/2008 | Hayton | G06F 16/9574 715/234 |
| 9,953,010 | B2* | 4/2018 | Doll | G06F 17/212 |
| 2010/0235411 | A1* | 9/2010 | Bray | G06F 17/3089 707/812 |
| 2011/0138267 | A1* | 6/2011 | Yi | G06F 3/016 715/234 |
| 2011/0239109 | A1* | 9/2011 | Nixon | G06F 17/2247 715/236 |
| 2012/0311623 | A1* | 12/2012 | Davis | H04N 5/765 725/18 |
| 2013/0097279 | A1* | 4/2013 | Polis | H04L 67/00 709/217 |
| 2013/0238980 | A1* | 9/2013 | Ruan | G06F 17/30902 715/234 |
| 2013/0339840 | A1* | 12/2013 | Jain | G06F 17/2247 715/234 |
| 2014/0082479 | A1* | 3/2014 | Guinane | G06F 17/2247 715/234 |
| 2014/0280054 | A1* | 9/2014 | Karunakaran | G06F 17/30991 707/722 |
| 2014/0281886 | A1* | 9/2014 | Hirsch | G06F 17/2247 715/234 |
| 2014/0337711 | A1* | 11/2014 | Poole | G06F 17/3089 715/234 |
| 2015/0074510 | A1* | 3/2015 | Price | G06F 17/227 715/234 |
| 2015/0143230 | A1* | 5/2015 | Zhang | G06F 17/30905 715/234 |
| 2016/0232134 | A1* | 8/2016 | Doll | G06F 17/212 |

* cited by examiner

METHOD AND SYSTEM FOR DISPLAYING CUSTOMIZED WEBPAGE ON DOUBLE WEBVIEW

CROSS-REFERENCE TO RELATED APPLICATIONS

This application claims the benefit of Chinese application No. 201310067421, entitled "DOUBLE-WEBVIEW CUSTOMIZED PAGE DISPLAY METHOD AND SYSTEM," filed with the Chinese Patent & Trademark Office on Mar. 4, 2013; and PCT Application No. PCT/CN2013/087803, entitled "METHOD AND SYSTEM FOR DISPLAYING CUSTOMIZED WEBPAGE ON DOUBLE WEBVIEW," filed on Nov. 26, 2013, of which the entire contents of both are hereby incorporated by reference.

FIELD

The invention relates to the field of mobile Internet technology, and more specifically, relates to a method and system for using Double WebView to display customized web pages.

BACKGROUND

Along with the development of mobile Internet technology, more and more people prefer browsing web pages through mobile terminal devices, enjoying the convenience of having the Internet in the pocket. However, due to the limit of hardware of mobile devices, the browsing effect of the browsers on mobile terminal devices falls far behind that of PC browsers. Furthermore, moving the web pages viewed on PC browsers to the browsers on mobile terminal devices will consume huge data traffic. Therefore, many browsers on mobile terminal devices have realized customization of web pages.

Generally, there are two major ways of customization of web pages by browsers:

1. Forward the request for a web page from a user's browser to the server of the browser's manufacturer, which in turn will obtain the data of the web page from the actual address of the web page, and customize the web page; and 2. Obtain the data of the web page in the normal way rather than through the transit and customization by the manufacturer's server; however, after obtaining the data of the web page, the browser will modify HTML Document Object Model (DOM) tree by inputting JavaScript (JS), JS language or through other means, so as to modify the display effect and functions of the web page, thus realizing the purpose of customization.

However, both methods for the purpose of customization have serious limitations and shortcomings. First of all, for the customization of web page through the manufacturer's server, some background servers must be established to maintain the function of customizing web pages, which will increase the cost of maintenance; moreover, the function of customizing web pages will be affected when the server breaks down. In addition, this mode of transit will also reduce the speed of opening web pages. Second, the modification of DOM tree through inputting JS or otherwise will damage the structure of DOM tree of the original web page, as a result of which the functions of web page, such as caching and saving the source code of the web page will be affected. Because the original web page has been modified, the DOM tree that has already been cached cannot be used when the web page is re-opened. As the process of saving the source code of the web page is actually a process of re-resolving the DOM tree into a character string, as a consequence of which the original functions of caching and saving the source code of the web page will no longer be effective. In addition, this mode of inputting JS or otherwise modifying DOM tree will be unable to block the advertisements controlled by web page JS after the customization. Finally, neither of the two methods of customizing web pages described above can realize seamless switch between entering and exiting from the mode of customization.

BRIEF SUMMARY

In various embodiments, the purpose of the present invention is to provide a method and a system to display customized pages, so as to realize the customization of web pages and the seamless switch between the original page and the customized web page.

According to one embodiment, a method is provided for displaying a Double WebView. The method comprises determining a template type to generate a customized page based on loaded information of an original web page, wherein the original web page is loaded via a mobile Internet. The method further includes creating a new WebView associated with a primary web page based on the template type, wherein the primary web page is the original web page or a web page evolved from operating on the original web page. The method further includes loading a template corresponding to the template type of the new WebView, creating a built-in JavaScript object within the new WebView, obtaining data of the primary web page through the built-in JavaScript object generating a customized page within the new WebView based on the data of the primary web page; and displaying the customized page.

According to an alternate embodiment, a system for displaying a Double WebView is provided. The system comprises a template type determination unit that is configured to determine a template type to generate a customized page based on a loaded page information of an original web page, wherein the original web page loaded via a mobile Internet. The system further includes a template loading unit that is configured to create a new WebView associated with a primary web page based on the template type and load a template corresponding to the template type of the new WebView, wherein the primary web page is the original web page or a web page evolved from operating on the original web page. The system further includes a page data acquisition unit that is configured to create a built-in JavaScript object within the new WebView, and obtain data of the primary web page through the built-in JavaScript object; a customized page generation unit that is configured to generate a customized page within the new WebView based on the data of the primary web page; and a customized page display unit that is configured to display the customized page.

An additional embodiment includes a non-transitory computer-readable storage medium for displaying a Double WebView, which, when executed by one or more processors, cause an apparatus to at least perform the following steps. The steps includes determining a template type to generate a customized page based on loaded information of an original web page, wherein the original web page is loaded via a mobile Internet. The step further includes creating a new WebView associated with a primary web page based on the template type, wherein the primary web page is the original web page or a web page evolved from operating on the original web page. The step further includes loading a template corresponding to the template type of the new WebView, creating a built-in JavaScript object within the new WebView, obtaining data of the primary web page through the built-in JavaScript object generating a customized page within the new WebView based on the data of the primary web page; and displaying the customized page.

According to an alternate embodiment, a method for displaying a customized page with double WebView is provided in one aspect of the present invention, including:

Determine the template type of the customized page according to the information about the original web page that is loaded;

Create a new WebView according to the template type of the customized page that is determined, and load the template of the customized page determined according to the said information about the original web page on the new WebView created;

Create a built-in JS object in the said new WebView to enable the template of the customized page running on the said new WebView to visit the WebView of the primary web page, so as to obtain the page data of the said primary web page;

Generate a new web page within the said new WebView as the customized page according to the page data of the primary web page obtained;

Then display the customized page generated.

Wherein, the said process to determine the template type of the customized page according to the loaded information about the original web page includes: When the original web page is loaded to the preset stage, determine it according to the loaded information about the original web page. The optimal plan is: the said preset stage is the stage when the creation of the DOM tree of the said web page is started and when the creation of the DOM tree of the said original web page is completed or the creation of the BODY nod of the said original web page is started.

Besides, the optimal plan is: during the process of the creation of the built-in JS object in the said new WebView, add two interfaces in the said built-in JS object to visit the Document object and Window object in the WebView of the primary web page.

Besides, the optimal plan is: complete the switch between the customization mode and the non-customization mode of a web page through the switch between the new WebView and the WebView of the primary web page.

Wherein, the process of the switch between the said customization mode and the non-customization mode includes: when exiting the customization mode, cover the WebView of the said primary web page on the said new WebView; when entering the customization mode after exiting the customized page, cover the said new WebView on the WebView of the said primary web page.

Wherein, modify the data of the WebView of the primary web page through the operation of the new WebView and further modify data on the customized page so as to complete the data transmission between the new WebView and the WebView of the said primary web page.

On the other hand, the present invention provides a system for the display of a customized page with Double WebView, including:

A template type determination unit that is used to determine the template type of the customized page according to the loaded information about the original web page;

A template loading unit that is used to create a new WebView according to the set template type of the customized page and to load the customized page template on the new WebView created according to the said information about the original web page;

A page data acquisition unit that is used to create a built-in JS object in the said new WebView to enable the customized page template running on the said new WebView to visit the WebView of the previous page so as to obtain the page data of the said primary web page;

A customized page generation unit that is used to generate a new page within the new WebView as the customized page according to the page data of the previous page obtained; and A customized page display unit that is used to display the said customized page.

The method and system to display a customized page with the Double WebView in the present invention described above can realize the customization of web pages without the support of a customization server and the modification to the primary web page. They can also make possible the switch between the primary web page and the customized page, almost instantaneously. At the same time, they are able to screen and block advertisements on the web page. Meanwhile, the primary web page will be retained permanently after the completion of the customization, coexisting with the customized page. The operation of the customized page by the user will be transmitted to the primary web page effectively, and the feedback of the primary web page for user operation will be captured by the customized page, so that the customized page can be updated locally or globally in time.

In the first aspect, this application provides a method for the display of a customized page with Double WebView, including: determine the template type required by the generation of the customized page, wherein, the said primary web page is a web page loaded through mobile Internet; create new WebView according to the said template type, wherein, the said original web page is the said original web page, or a web page evolved from operation on the said original web page; load the template appropriate for the said template type on the said new WebView; create a built-in JavaScript object within the said new WebView and obtain the page data of the primary web page through the built-in JavaScript object; generate a customized page within the said new WebView according to the page data of the said primary web page; and display the said customized page.

Based on the first aspect, in the first possible implementation means in the first aspect, determine the template type required for the generation of the said customized page according to the original loaded web page information when the original web page is loaded to the preset stage. Wherein, the said preset stage is the stage when the creation of the DOM tree of the said original web page is started and when the creation of the DOM tree of the said original web page is completed or the creation of the BODY nod of the said original web page is started.

Based on the first aspect or the first possible implementation measures in the first aspect, in the second possible implementation means in the first aspect, determine the template type required for the generation of a customized page according to the original loaded web page information, including: determine the page mode of the original web page (wherein, the said page mode includes the reading mode, forum mode or story mode); and determine the template type appropriate for the customized web page according to the said page mode (wherein, the said template type includes the reading mode, forum mode or story mode).

Based on the second possible implementation means in the first aspect, in the third possible implementation means in the first aspect, during the process of the creation of a built-in JavaScript object within the new WebView, set up two interfaces in the said built-in JavaScript object so that the new WebView can visit the Document object and Window object of the WebView of the primary web page through the two interfaces.

Based on the first aspect, in the fourth possible implementation means in the first aspect, switch a web page between the customization mode and the non-customization mode through switching between the new WebView and the WebView of the primary web page.

Based on the fourth possible implementation means in the first aspect, in the fifth possible implementation means in the first aspect, the process of the switch between the customization mode and the non-customization mode includes: when exiting the customization mode, cover the WebView of the said primary web page on the said new WebView; and when entering the customization mode again after exiting the customization mode, cover the said new WebView on the WebView of the said primary web page.

Based on the first aspect, in the sixth possible implementation means in the first aspect, obtain page data of the previous page through a built-in JavaScript object, including: modify the data of the WebView of the primary web page through the operation of the new WebView and further modify the data on the customized page so as to complete the data transmission between the new WebView and the WebView of the said primary web page.

Based on the sixth possible implementation means in the first aspect, in the seventh possible implementation means in the first aspect, the process of data transmission between the new WebView and the WebView in the primary web page includes: when a user operates on the said new WebView, the JavaScript object of the new WebView is triggered, so that the new WebView sends the operation to the WebView in the primary web page through the Document object and Windows object of the primary web page; after the WebView in the primary web page responds to the said operation, the said new WebView will customize the said new WebView with the modifications to the WebView in the primary web page.

In the second aspect, this application provides a system that displays a customized page with Double WebView, including: a template type determination unit that is used to determine the template type required for the generation of the customized page with the original loaded page information (wherein, the said original web page is a web page loaded through the mobile Internet); a template loading unit that is used to create a new WebView according to the said template type and load the template appropriate for the said template type on the new WebView; a page data acquisition unit that is used to create a built-in JS object in the said new WebView and obtain page data of the primary web page through a built-in JavaScript object; a customized page generation unit that is used to generate a customized page in the said new WebView according to page data of the said previous page; and a customized page display unit that is used to display the said customized page.

Based on the second aspect, in the first possible implementation means in the second aspect, the said page data acquisition unit includes: a built-in JavaScript object creation unit which is used to create a built-in JavaScript object within the said new WebView and set two interfaces in the said built-in JavaScript object so that the new WebView can visit the Document object and Window object of the WebView of the primary web page through the two interfaces.

In the third aspect, this application provides a readable computer medium for program codes that can be executed by processors, which can be applied to mobile terminals. The said original mobile terminal shall at least include the monitor, and the said program code shall enable the processor to execute the following steps: determine the template type required for the generation of the customized web page according to the original loaded web page (wherein, the said primary web page is a web page loaded through the mobile Internet); create a new WebView according to the said template type (wherein, the said original web page is the said original web page or a web page, or a web page evolved from operation on the said original web page); load the template appropriate for the said template type on the said new WebView; create a built-in JavaScript object within the said new WebView and obtain the page data of the primary web page through the built-in JavaScript object; generate a customized page within the said new WebView according to the page data of the said primary web page and display the said customized page.

In order to achieve the objects mentioned above and the related objects thereof, one or a number of aspects of the present invention include the features that are going to be described in details next and specifically defined in the respective claims. The description and drawings set forth below in details of certain exemplary aspects of the present invention. However, these aspects merely indicate a few modes among the variety of different modes that are based on the principle of the present invention. In addition, the present invention is intended to encompass all of these aspects as well as equivalents thereof.

BRIEF DESCRIPTION OF THE DRAWINGS

The detailed description that is in reference to the drawings set forth below would make the objects mentioned above and other objects, characteristics and advantages of the present invention become obvious to understand.

Figure 1:
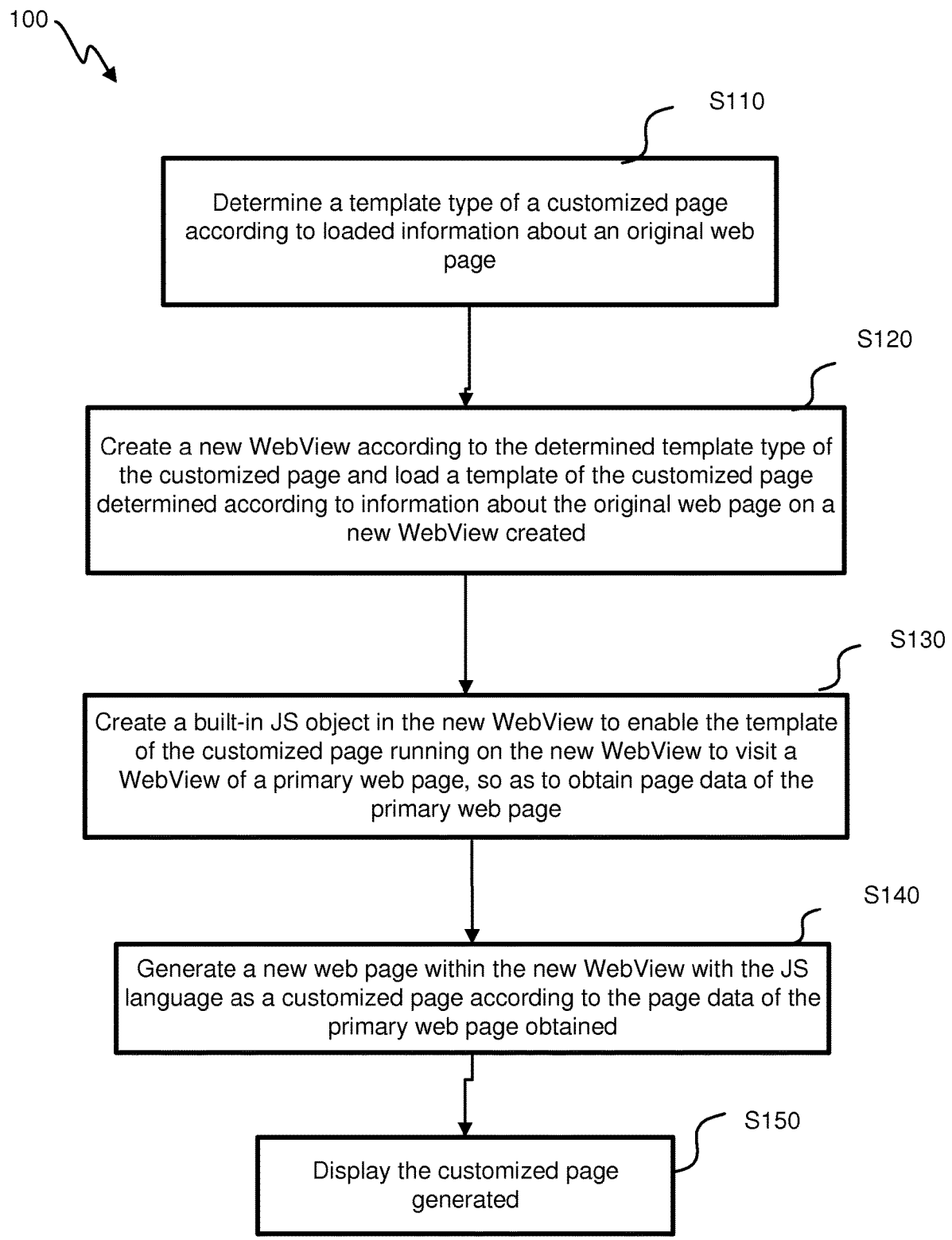
FIG. 1 is a schematic diagram for the process of the display of a customized web page with the double WebView provided according to an embodiment of the present invention.

In all of the foregoing figures included in the drawings of the present invention, the same symbol refers to similar or corresponding feature or function.

DETAILED DESCRIPTION

The various aspects of the present invention are described below. It should be understood that the teachings herein may be implemented in a variety of different modes, and that any specific structure, function, or both disclosed herein is merely representative. Based on the teachings herein one skilled in the art would understand that an aspect disclosed herein may be implemented independently of any other aspects and that two or more aspects among these aspects may be combined in various ways. For example, any aspect of numbers disclosed herein may be used to achieve the device or practice of the present invention. In addition, other structures, functions, or the structures and functions beyond the one or a number of aspects disclosed in the present invention or other than the one or a number of aspects disclosed in the present invention may be used to achieve the device or practice the method of the present invention. Moreover, any aspect described herein may comprise at least one element of a claim.

As used herein, the mobile terminal devices involved in the present invention mainly refer to cell phones and other terminal devices that visit the Internet with mobile terminal browsers and the mobile Internet. Besides, in order to explain the technical program of the present invention clearly, some terms involved in the description of the present invention will be interpreted as follows first:

Kernel of the browser: It is used for the loading and display of web pages and the execution of JS and is the core of the browser.

WebView: It is a view that is used to display a web page. Pictures with colors applied by the composition by the kernel of the browser will be displayed on the WebView. All contents of web page that can be seen by the user via the mobile terminal browser are shown on the WebView.

Document object: It is a built-in object provided by the JavaScript language, which is used for the operation of a Document Object Model (DOM) tree, event and so on of the web page.

Window object: It is a built-in object provided by the JavaScript language, which is used to visit some variables of web pages.

Template: It is the assembly of some JS documents and html documents. Such documents can draw page data of the original web page and create a new customized web page.

DOM: Document object model.

BODY nod: A special nod of a web page.

Original web page: The web page loaded with the original request from the mobile terminal browser. The template type of the customized web page will be determined according to information about the original web page.

Primary web page: It is a web page loaded directly through the mobile Internet against the customized page. It can be the page loaded with the original request from the mobile terminal browser, that is, the original web page; it can also be a web page evolved from refreshing, searching and other operations based on the original web page.

In some embodiments, as for existing technologies, the customization of a web page can be done only when there is no support from the server and it is necessary to modify the primary web page. Besides, it will take a long time to switch between the web page and the primary web page and the customized page and advertisements from the web page cannot be screened and blocked effectively. In order to solve this problem, in the present invention, a page is customized without the support from the server of the browser manufacturer through the coverage of the WebView of the web page. Meanwhile, during this process of page customization, it is unnecessary to modify the content of the page; besides, it can also switch between the customized page and the primary web page quickly and screen and block advertisements from the web page.

In some embodiments, the method for the display of a customized page with the Double WebView in the present invention is introduced in greater detail as follows with the Android platform as an example.

FIG. 1 is a schematic diagram for the process of the display of a customized page with the Double WebView provided according to an embodiment of the present invention. As shown in FIG. 1, in the step S110, the template type of the customized page is determined according to the loaded information about the original web page. In the step S120, a new WebView is created according to the template type of the customized page determined, and load the template of the customized page determined according to information about the original web page on the new WebView created.

Subsequently, in the step S130, a built-in JS object in the new WebView is created to enable the customized page template running on the said new WebView to visit the WebView of the previous page so as to obtain the page data of the said primary web page, wherein, during the process of the creation of a built-in JavaScript object within the new WebView, set up two interfaces in the said built-in JavaScript object so that the new WebView can visit the Document object and Window object of the WebView of the primary web page.

Next, in the step S140, a new web page within the said new WebView with the JS language is generate as the customized page according to the page data of the primary web page obtained.

In the step S150, the customized page for display is generated.

Preferably, the process to determine the template type of the customized page in step S110 includes: When the original web page is loaded to the preset stage, determine the template type of the customized page according to the loaded information about the original web page. In the embodiment of the current invention, the said preset stage is the stage when the creation of the DOM tree of the said web page is started and when the creation of the DOM tree of the said original web page is completed or the creation of the BODY nod of the said original web page is started.

Preferably, a web page may have different page modes according to the functions of the web page. For example, for a web page with the forum function, the page mode is the forum model; for a web page with the reading function, the page mode is the reading mode. Web pages with different functions have their own characteristics in terms of the page mode. However, not all page modes can be customized, and not all page modes are necessary and meaningful for customization. For a page with few functions and prominent page characteristics, such as forum web pages and novel browsing web page, etc., customization can be used to screen some contents such as advertisements that have nothing to do with major functions of the web page. As for some all-purpose websites, due to the complicated content of module and the various kinds of functions included therein, such websites cannot be customized with a single page mode.

In some embodiments, one can judge whether a web page is a web page just with a single function according to the structure of the DOM or characteristics of the BODY nod during the process of the loading of the website, so as to further determine whether the web page can be customized. Correspondingly, in a specific implementation method in the present invention, the template types of a customized web page include the forum mode, the reading mode and the story mode.

In some embodiments, an optimal implementation method for the present invention is that: When the original web page is loaded to a certain stage, it is necessary to determine whether the web page can be customized. If the web page cannot be customized, then load the web page in a normal manner; otherwise, determine the template type of the customized page according to the stage the web page is loaded to. For instance, when the original web page is loaded to a certain stage, whether the web page can be customized or not can also be determined according to the URL (Uniform/Universal Resource Locator) of the original web page or the Metal label information of the original web page. Also, what type of template is needed for the customized web page can also be determined according to such information.

In some embodiments, professionals in this field can take various measures to determine the template type for customization according to the loaded information about the original web page. For instance, after data with the head label of the loaded web page are obtained, check whether there is any meta label named "generator". If any, then obtain the content value of the meta label, the content value being the forum type. For instance, if the head has the label <meta name="generator" content="Discuz! X2">, then it will be known that this web page is Discuz! X2 Forum and the customized template for Discuz! X2 can be used.

In addition, if the website visited by the user is a popular story website such as www.qidian.com, the web page can be identified as a story website according to the white list of certain websites in a preset record. In this case, the customized template of a story website can be used directly during the loading of the web page. Wherein, the white list for certain websites in the preset record may include the list of story websites, and the list of forum websites, etc.

In some embodiments, the template type of a customized page can be divided into the forum mode, the reading mode and the story mode by the page template of the original web page.

Figure 2:
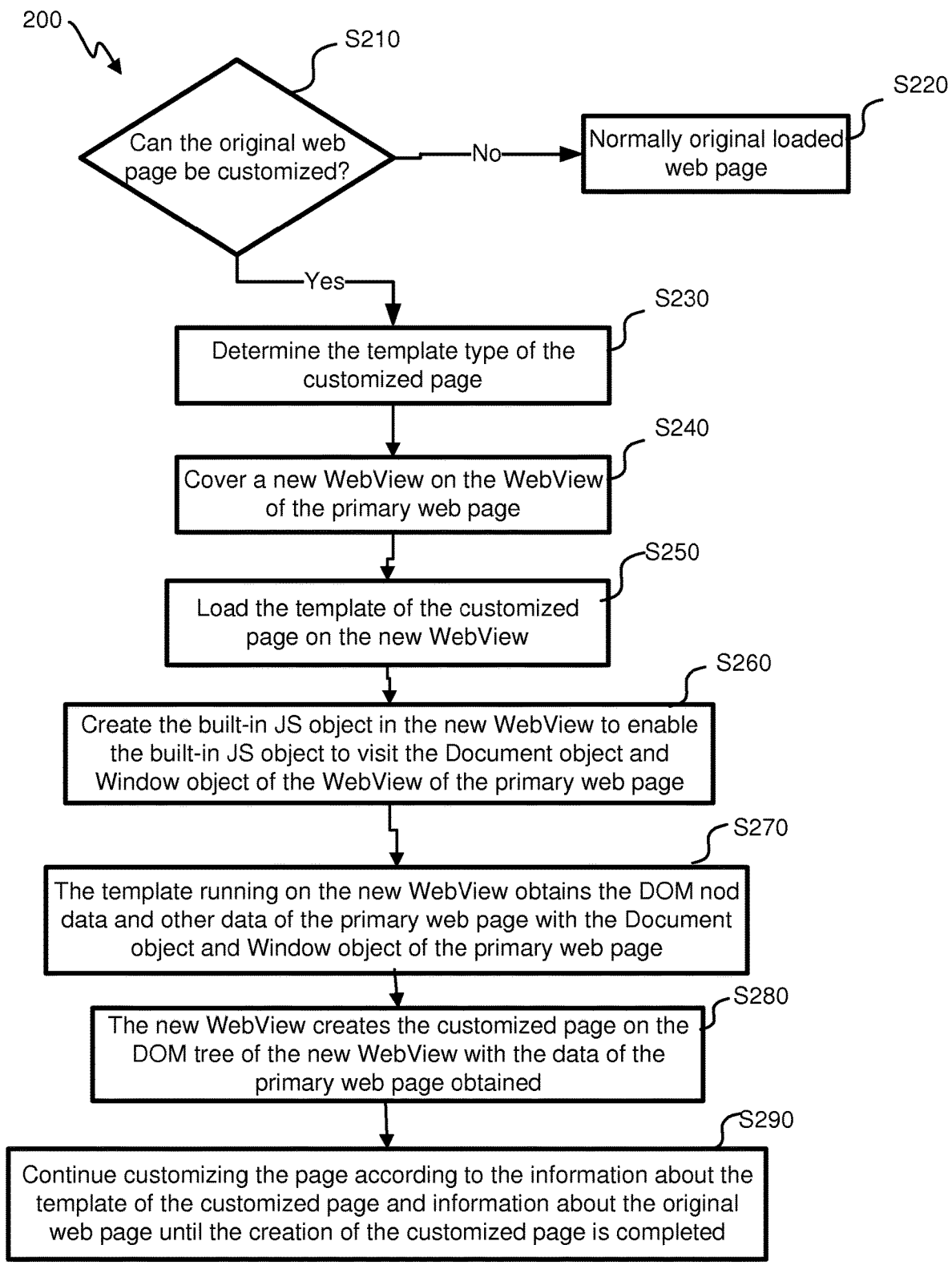
FIG. 2 is a is a schematic diagram for the process of the generation of customized web pages provided according to an embodiment of the present invention.

In order to clearly explain the method for the display of a customized page with the Double WebView, FIG. 2 shows a schematic diagram for the process of the generation of customized web pages provided according to an embodiment of the present invention. The generation of a customized page will be explained in detail according to the following FIG. 2. As shown in FIG. 2, in the step S210, the original web page is loaded to a certain stage, whether the original web page can be customized is determined. If it can be customized, execute step S230; otherwise execute step S220.

Subsequently, in the step S220, the original web page is loaded in the normal way. In the step S230, the template type of the customized page is determined. In the step S240, a new WebView according to the template type of the customized page is created. In the step S250, the template of the customized page is determined according to the said information about the original web page on the new WebView.

Next, in the step S260: Create a built-in JS object so that the built-in JS object can visit the Document object and Window object of the WebView of the primary web page. In the step S270, the template running on the new WebView obtains the DOM nod data and other data of the primary web page with the Document object and Window object in the WebView of the primary web page. In the step S280, the new WebView creates a customized page on the DOM tree of the WebView of the primary web page with the DOM nod data from the primary web page and other data from the primary web page as well as the original web page. In the step S290, customization of the page according to information about the template of the customized page and information about the original web page until the creation of the customized page is completed.

In one embodiment, the template of the customized page consists of some HTML documents and JS documents. The JS of the template of the customized page can use a special JS object. By way of example, suppose the name of the object is JSController. Then the Document object and Window object opened in the covered primary web page can be obtained through the JSController. All the page data of the primary web page can then be obtained through the Document object and Window object. With these page data and information of the primary web page, a new page can be generated in the WebView of the primary web page with the method provided by the JS language. The new page is the customized page.

In some embodiments, when the WebView of the primary web page covers the WebView of the original web page, though there will be two WebViews, the user can only operate on the new WebView and can only see the new WebView, that is, the WebView of the customized page. The WebView of the primary web page will not be destroyed after the completion of the customization. It is just covered and shielded by the new WebView. The switch between the customization mode and the non-customization mode of the web page can be done through the switch between the new WebView and the WebView of the primary web page.

In some embodiments, the process of the switch between the customization mode and the non-customization mode includes: when exiting the customization mode, cover the WebView of the said primary web page on the said new WebView; when entering the customization mode after exiting the customized page, cover the said new WebView on the WebView of the said primary web page.

In one embodiment, just because the WebView of the primary web page will not be destroyed after the completion of the customization and is just covered and shielded by the new WebView, it can at the same time serve as the event processor and data provider for the new WebView.

In one example, by way of example, when the user operates the new WebView, such as entering text in a text box or clicking a button, the new WebView can transmit the operation to the WebView of the primary web page, and the WebView of the primary web page will process and respond to such operation. The new WebView can continue customizing and displaying the response of the WebView of the primary web page. These two WebViews depend on and coordinate with each other. The WebView of the primary web page obtains the content entered by the user via the new WebView and at the same time serves as the event processor and data provider for the new WebView.

Preferably, complete the change of data of the WebView of the primary web page through the operation of the new WebView and further change data of the customized page, so as to complete the data transmission between the new WebView and the WebView of the said primary web page.

Figure 3:
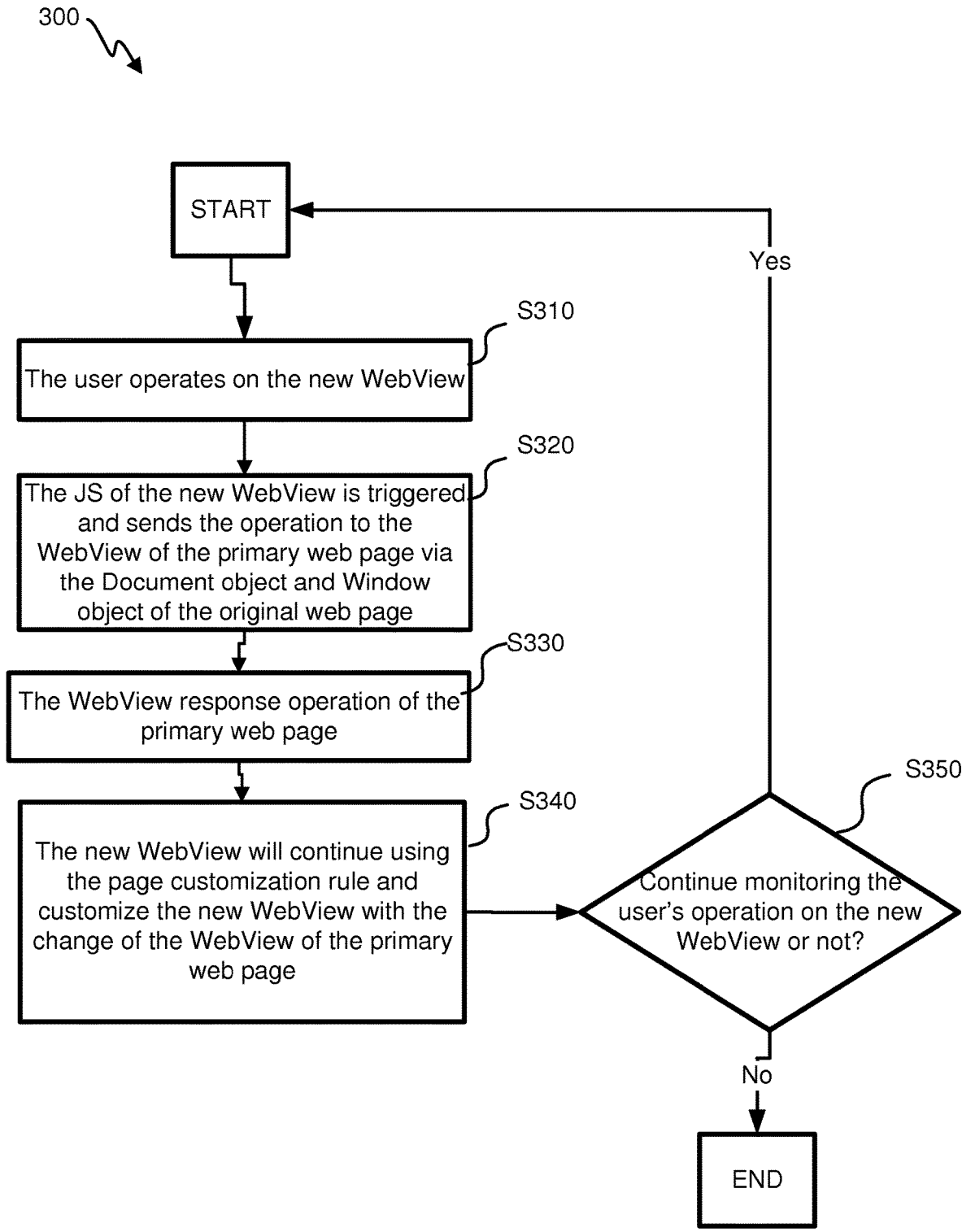
FIG. 3 is a schematic diagram for the process of the data transmission between the new WebView and the WebView of the original web page provided according to an embodiment of the present invention.

FIG. 3 is a schematic diagram for the process of the data transmission between the new WebView and the WebView of the original web page provided according to an embodiment of the present invention. In the step S310, the user operates on the new WebView. In the step S320, the JS of the new WebView is triggered and sends the operation to the WebView of the primary web page through the Document object and Windows object of the primary web page. In the step S330, the WebView of the primary web page responds to the operation.

Next, in the step S340, the new WebView is customized with the change of the WebView of the primary web page after the WebView of the primary web page responds to the operation. After the new WebView monitors the change of the WebView of the primary web page in this step, then the new WebView will be customized with the change of the WebView of the primary web page in real time according to the page customization rule. In the step S350, whether to continue monitoring the user's operation on the new WebView is determine. If yes, execute S310; if no, finish the process.

In some embodiments, according to the foregoing implementation example, it can be seen that the method for the display of a customized page with Double WebView provided in the present invention can customize a page without the support from the server of the browser manufacturer. Meanwhile, during this process of customization, it is not necessary to modify the content of the page. Besides, as the WebView of the primary web page will not be destroyed after the completion of the customization, the switch between the primary web page and the customized page can go on rapidly and seamlessly, and cache can be used more effectively.

Preferably, for existing web page customization technologies, during the process of page customization, some special elements of the original web page cannot be fully hidden. The JS of the primary web page may generate some other web page elements through some timers. Such elements will interfere with the customized page, such as popup advertisements. In the present invention, however, the method for the display of a page with Double WebView is to cover the WebView of the customized page on the WebView of the primary web page. In this way, any other elements popping up from the primary web page will not have any effect on the customized page. As the WebView of the primary web page is covered, it cannot affect the WebView of the customized page, and the WebView of the primary web page will not be destroyed after the completion of the customization. These two WebViews depend on and coordinate with each other. The WebView of the primary web page obtains the content entered by the user via the new WebView and at the same time serves as the event processor and data provider for the new WebView.

Several specific examples of implementation will be provided as follows to explain the technical effect of the display of a customized page with Double WebView in the present invention.

Embodiment 1

An existing mobile terminal browser assists in the customization of pages through a middleware server, such as the customization of the forum mode, the story-reading mode and etc. However, with the popularity of WIFI, the speed may be affected by this transition method. Meanwhile, it will cause the coupling of the client end and the server, and some uncertain factors will prevent the middleware server of the browser from running normally. As a result, these functions required for the customization service cannot be used. In the present invention, however, the method for the display of a page with Double WebView will not be affected by the performance of the server as it does not need the support of the server for page customization.

Embodiment 2

Suppose a customization mode is completed by the modification to the DOM tree with the local input of JS at the client end of the browser. When the user wants to exit the customization mode, he can only refresh the page or remove the modification to the DOM tree. Refreshing takes time, and a lot of JS commands need to be executed to delete the modification to the DOM tree. As a result, the resources of the machine are spent. Besides, due to the execution of such time-consuming JS operation, seamless switch cannot be realized.

In the present invention, however, with the method for the display of a page with Double WebView, the user only needs to exchange positions of the WebView of the customized page and the WebView of the original web page when he wants to exit the customization mode without executing any JS command; and when he wants to enter the reading mode again, he can realize it by exchanging positions of the WebView of the primary web page and the WebView of the customized page.

Embodiment 3

Suppose a certain customization mode is completed by the modification to the DOM tree of the web page with the local input of JS at the client end of the browser but some timers are started by the JS of the primary web page. These timers will pop up an advertisement at a certain interval. In this case, the customized page will show these advertisements too, as the customized page cannot identify these advertisements so that it cannot hide or delete them.

In the present invention, however, with the method for the display of a page with Double WebView, advertisements popping up from the primary web page will only be displayed in the primary web page. As the previous page is covered by another new WebView, that is, the WebView of the customized page, the customized page will not be affected in any manner.

Embodiment 4

When the user opens the customized page and wants to save the primary web page, the saving function of the browser will cause the saving of the customized page. Meanwhile, it is difficult for the browser to recover the web page code of the primary web page completely. In the present invention, however, with the method for the display of a page with Double WebView, as the DOM tree of the primary web page is not modified, data of the original web page can be kept completely.

According to the foregoing specific examples of implementation, it can be seen that, with the method for the display of a page with Double WebView, the customization of web pages as well as the seamless switch between the primary web page and the customized page can be realized, and advertisements from the web page can also be screened and blocked effectively.

Figure 4:
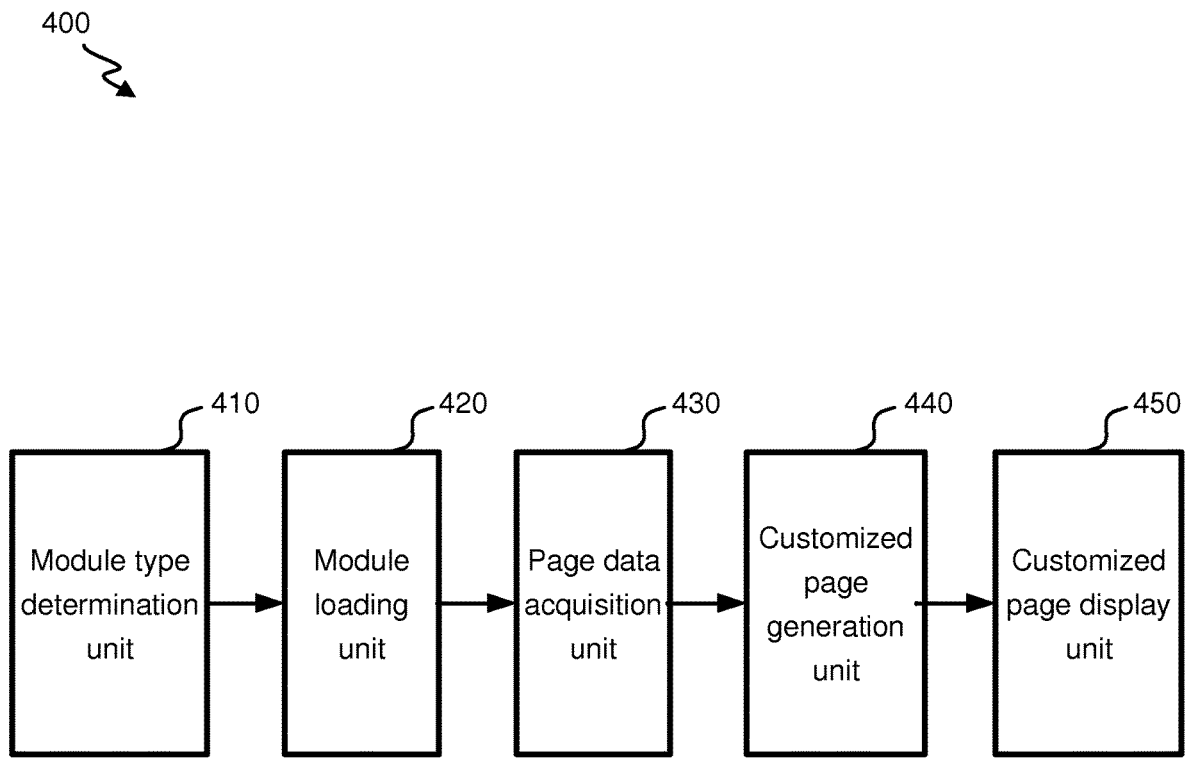
FIG. 4 is a block diagram for a system for the display of customized pages with Double WebView provided according to an embodiment of the present invention.

Corresponding to the foregoing method, the present invention also provides a system for the display of the customized page with Double WebView. FIG. 4 is a block diagram for a system for the display of customized pages with Double WebView provided according to an embodiment of the present invention. According to FIG. 4, the system for the display of web pages with Double WebView provided in the present invention includes the template type determination unit 410, template loading unit 420, page data acquisition unit 430, customized page generation unit 440 and customized page display unit 450. Wherein, the page data acquisition unit 430 can also include a built-in JS object (not shown in the figure).

In some embodiments, the template type determination unit 410 is used to determine the template type of the customized page according to the loaded information about the original web page; the template loading unit 420 is used to create a new WebView according to the template type of the customized page determined by the customized page template determination unit 410, and load the template of the customized page determined according to information about the original web page on the new WebView; the page data acquisition unit 430 is used to create a built-in JS object on the new WebView created to enable the template of the customized page running on the new WebView to visit the WebView of the primary web page so as to obtain the page data of the primary web page; the customized page generation unit 440 is used to generate a new page in the new WebView as the customized page according to the page data obtained according to the page data acquisition unit 430; the customized page display unit 450 is used to display the customized page generated by the web page customization unit 440. The page data acquisition unit 430 further includes the built-in JS object creation unit, which is used to create a built-in JS object in the new WebView and add two interfaces in the built-in JS object to visit the Document object and Window object in the WebView of the primary web page.

Although the foregoing disclosure shows the exemplary embodiments of the present invention, it should be noted that various possible changes and modifications thereof may be made without departing from the scope of the present invention as defined by the claims thereof. In addition, it is not necessary to implement in any particular order or orders for the respective functions, steps and/or actions claimed in the respective claims that are directed to the method of the present invention based on the embodiments described herein. Furthermore, although the elements of the present invention may be described or claimed in the singular form thereof, they may also be in form of a plurality of pieces, unless explicitly restricted to be singular.

Although the various embodiments of the present invention have been described in reference to the drawings, it should be understood to a person of ordinary skill in the art that various modifications may be made to the embodiments of the present invention described above without departing from the content of the present invention. Therefore, the scope of the present invention should be determined by the appended claims.

That which is claimed:

1. A method for displaying a Double WebView, the method comprising:
   determining a template type to generate a customized page based on loaded information of an original web page, wherein determining the template type comprises obtaining a value of an identification tag indicating a forum template type, a reading template type, or a story template type;
   creating a new WebView associated with a primary web page based on the template type, wherein the primary web page is the original web page or a web page evolved from operating on the original web page;
   loading a template corresponding to the template type of the new WebView;
   creating a built-in scripting object within the new WebView;
   obtaining data of the primary web page through the built-in scripting object;
   generating according to the template the customized page within a HTML (Hypertext Markup Language) DOM (Document Object Model) tree of the new WebView based on the data of the primary web page;
   displaying the customized page;
   in response to a user operation on the new WebView, transmitting the user operation to a WebView of the primary web page; and
   modifying data on the customized page according to a change to the WebView of the primary web page in response to the user operation.

2. The method of claim 1, further comprising:
   determining the template type based on the loaded information of the original web page when the original web page is loaded to a preset stage, wherein, the preset stage is a stage associated to a first starting point of a creation of the HTML DOM tree of the original web page, a completion point of the creation of the DOM tree of the original web page and a second starting point of a creation of a BODY nod of the original web page.

3. The method of claim 1, further comprising:
   determining a page mode of the original web page based on the loaded information about the original web page; wherein, the page mode includes a reading mode, a forum mode and a story mode; and
   determining the template type appropriate for the customized page according to the page mode, wherein the template type includes the forum template type, the reading template type, or the story template type.

4. The method of claim 1, wherein the creating of a built-in scripting object within the new WebView, further comprises:
   setting up two interfaces in the built-in scripting object to enable the template loaded on the new WebView to access a Document object and a Window object of the WebView of the primary web page through the two interfaces.

5. The method of claim 1, further comprising:
   switching the web page between a customization mode and a non-customization mode by switching between the new WebView and a WebView of the primary web page.

6. The method of claim 5, wherein switching the web page between the customization mode and the non-customization mode further comprises:
   covering the WebView of the primary web page on the new WebView when exiting the customization mode; and
   covering the new WebView on the WebView of the primary web page when entering the customization mode after exiting the customization mode.

7. The method of claim 1, wherein obtaining the data of the primary web page through the built-in scripting object, further comprises:
   modifying the data of the WebView of the primary web page through the user operation on the new WebView and modifying the data on the customized page in order to complete the data transmission between the new WebView and the WebView of the said primary web page.

8. The method of claim 7, wherein the data transmission between the new WebView and the WebView in the primary web page, further comprises:
   triggering the scripting object of the new WebView in response to the user operation on the said new WebView, in order for the new WebView to send the user operation to the WebView in the primary web page through a Document object and a Windows object of the primary web page, and
   customizing the new WebView with modifications to the WebView in the primary web page after the WebView in the primary web page responds to the user operation.

9. The method of claim 3, wherein determining the page mode of the original web page is further based on information provided in a preset white list for web pages, wherein the preset white list comprises a preset record of web pages classified as either a story, forum, or reading web page.

10. The method of claim 1, further comprising modifying in real time the data on the customized page according to the change to the WebView of the primary web page in response to the user operation.

11. A system for displaying a Double WebView, the system comprising at least one processor configured to:
    determine a template type to generate a customized page based on a loaded page information of an original web page, wherein determining the template type comprises obtaining a value of an identification tag indicating a forum template type, a reading template type, or a story template type;
    create a new WebView associated with a primary web page based on the template type;
    load a template corresponding to the template type of the new WebView, wherein the primary web page is the original web page or a web page evolved from operating on the original web page;
    create a built-in scripting object within the new WebView;
    obtain data of the primary web page through the built-in scripting object;
    generate according to the template the customized page within a HTML (Hypertext Markup Language) DOM (Document Object Model) tree of the new WebView based on the data of the primary web page;
    display the customized page;
    in response to a user operation on the new WebView, transmit the user operation to a WebView of the primary web page; and
    modify data on the customized page according to a change to the WebView of the primary web page in response to the user operation.

12. The system of claim 11, wherein the at least one processor is further configured to:
    create the built-in scripting object within the new WebView and set two interfaces in the built-in scripting object to enable the template loaded on the new WebView to access a Document object and a Window object of the WebView of the primary web page through the two interfaces.

13. A non-transitory computer-readable storage medium for displaying a Double WebView, which, when executed by one or more processors, cause an apparatus to at least perform the following:
    determining a template type to generate a customized page based on loaded information of an original web page, wherein determining the template type comprises obtaining a value of an identification tag indicating a forum template type, a reading template type, or a story template type;
    creating a new WebView associated with a primary web page based on the template type, wherein the primary web page is the original web page or a web page evolved from operating on the original web page;
    loading a template corresponding to the template type of the new WebView;
    creating a built-in scripting object within the new WebView;
    obtaining data of the primary web page through the built-in scripting object;
    generating according to the template the customized page within a HTML (Hypertext Markup Language) DOM (Document Object Model) tree of the new WebView based on the data of the primary web page;
    displaying the customized page;
    in response to a user operation on the new WebView, transmitting the user operation to a WebView of the primary web page; and
    modifying data on the customized page according to a change to the WebView of the primary web page in response to the user operation.

14. The non-transitory computer-readable storage medium for displaying a Double WebView of claim 13, further comprising:
    determining the template type based on the loaded information of the original web page when the original web page is loaded to a preset stage, wherein, the preset stage is a stage associated to a first starting point of a creation of the HTML DOM tree of the original web page, a completion point of the creation of the DOM tree of the original web page and a second starting point of a creation of a BODY nod of the original web page.

15. The non-transitory computer-readable storage medium for displaying a Double WebView of claim 13, further comprising:
    determining a page mode of the original web page based on the loaded information about the original web page; wherein, the page mode includes a reading mode, a forum mode and a story mode; and
    determining the template type appropriate for the customized page according to the page mode, wherein the second template type includes the forum template type, the reading template type, or the story template type.

16. The non-transitory computer-readable storage medium for displaying a Double WebView of claim 13, wherein the creating of a built-in scripting object within the new WebView, further comprises:
    setting up two interfaces in the built-in scripting object to enable the template loaded on the new WebView to access a Document object and a Window object of the WebView of the primary web page through the two interfaces.

17. The non-transitory computer-readable storage medium for displaying a Double WebView of claim 13, further comprising:
    switching the web page between a customization mode and a non-customization mode by switching between the new WebView and a WebView of the primary web page.

18. The non-transitory computer-readable storage medium for displaying a Double WebView of claim 17, wherein switching the web page between the customization mode and the non-customization mode further comprises:
    covering the WebView of the primary web page on the new WebView when exiting the customization mode; and
    covering the new WebView on the WebView of the primary web page when entering the customization mode after exiting the customization mode.

19. The non-transitory computer-readable storage medium for displaying a Double WebView of claim 13, wherein obtaining the data of the primary web page through the built-in scripting object, further comprises:
    modifying the data of the WebView of the primary web page through the user operation on the new WebView and modifying the data on the customized page in order to complete the data transmission between the new WebView and the WebView of the said primary web page.

20. The non-transitory computer-readable storage medium for displaying a Double WebView of claim 19, wherein the data transmission between the new WebView and the WebView in the primary web page, further comprises:
- triggering the scripting object of the new WebView in response to the user operation on the said new WebView, in order for the new WebView to send the user operation to the WebView in the primary web page through a Document object and a Windows object of the primary web page, and
- customizing the new WebView with modifications to the WebView in the primary web page after the WebView in the primary web page responds to the user operation.

* * * * *